United States Patent
Brekke et al.

(10) Patent No.: US 8,532,120 B2
(45) Date of Patent: *Sep. 10, 2013

(54) ROUTING FACILITY FOR A SUBSEA ELECTRONICS MODULE

(75) Inventors: Endre Brekke, Trondheim (NO); Vegard Horten, Rasta (NO); Vidar Steigen, Nittedal (NO)

(73) Assignee: Siemens Aktiengesellschaft, Munich (DE)

( * ) Notice: Subject to any disclaimer, the term of this patent is extended or adjusted under 35 U.S.C. 154(b) by 726 days.

This patent is subject to a terminal disclaimer.

(21) Appl. No.: 12/441,991

(22) PCT Filed: Sep. 25, 2006

(86) PCT No.: PCT/EP2006/009308
§ 371 (c)(1), (2), (4) Date: Jul. 7, 2009

(87) PCT Pub. No.: WO2008/037268
PCT Pub. Date: Apr. 3, 2008

(65) Prior Publication Data
US 2010/0008371 A1    Jan. 14, 2010

(51) Int. Cl.
*H04L 12/28* (2006.01)
(52) U.S. Cl.
USPC .......................................... 370/401; 348/575
(58) Field of Classification Search
USPC .......................................... 370/401; 348/575
See application file for complete search history.

(56) References Cited

U.S. PATENT DOCUMENTS

| | | | | |
|---|---|---|---|---|
| 5,892,924 A | * | 4/1999 | Lyon et al. | 709/245 |
| 6,229,576 B1 | * | 5/2001 | Tarr et al. | 348/575 |
| 2003/0109281 A1 | * | 6/2003 | Knoblach et al. | 455/556 |
| 2003/0208638 A1 | * | 11/2003 | Abrams et al. | 709/328 |
| 2004/0234019 A1 | * | 11/2004 | Kim et al. | 375/372 |
| 2005/0143022 A1 | * | 6/2005 | Elayda et al. | 455/90.3 |
| 2005/0273821 A1 | * | 12/2005 | Hundley | 725/62 |
| 2006/0133389 A1 | * | 6/2006 | Wybenga et al. | 370/401 |
| 2007/0214949 A1 | * | 9/2007 | Barton | 86/50 |

FOREIGN PATENT DOCUMENTS

| | | |
|---|---|---|
| EP | 0 975 097 A2 | 1/2000 |
| RU | 2002130462 A | 5/2004 |
| WO | 03/001741 A1 | 1/2003 |

OTHER PUBLICATIONS

Ameli F: "The NEMO floor control module" Real Time Conference, 2005, 14th IEEE-NPSS Stockholm, Sweden, Jun. 4-10, 2005, pp. 54-58, XP010858976; Others.

Nicolau et al: "An FPGA-based readout electronics for neutrino telescopes", Nuclear Instruments & Methods in Physics Research, Section-A: Accelerators, Spectrometers, Detectors and Associated Equipment, Elsevier, Amsterdam, NL, vol. 567, No. 2, Nov. 15, 2006, pp. 552-555, XP005712278; Others.

(Continued)

*Primary Examiner* — Wei Zhao
(74) *Attorney, Agent, or Firm* — King & Spalding L.L.P.

(57) ABSTRACT

A routing facility (1) for a subsea electronics module (7) has a microcontroller (3), a field programmable gate array (4) and at least two router resources (5) on a single circuit board (2), each router resource (5) comprising a respective local transceiver (9) for a differential serial bus and a respective remote transceiver (10) for the differential serial bus, wherein each local transceiver (9) is connected with the corresponding remote transceiver (10) and with the field programmable gate array (4) that is able to route data packets between the router resources (5).

19 Claims, 5 Drawing Sheets

(56) References Cited

OTHER PUBLICATIONS

International PCT Search Report, PCT/EP2006/009308, 10 pages, Mailed Jun. 26, 2007.
Ameli, F., "The NEMO Floor Control Module", Real Time Conference 14th IEEE-NPSS, Stockholm Sweden, XP010858976. pp. 54-58, Jun. 4, 2005.

Nicolau, C.A., "An FPGA-based Readout Electronics for Neutrino Telescopes", Nuclear Instruments & Methods in Physics Research, Section A: Accelerators, Spectrometers, Detectors and Associated Equipment; vol. 567, No. 2, pp. 552-555, Nov. 15, 2006.

* cited by examiner

FIG 7

ROUTING FACILITY FOR A SUBSEA ELECTRONICS MODULE

CROSS-REFERENCE TO RELATED APPLICATIONS

This application is a United States national phase filing under 35 U.S.C. §371 of International Application No. PCT/EP2006/009308, filed Sep. 25, 2006. The complete disclosure of the above-identified application is hereby fully incorporated herein by reference.

TECHNICAL FIELD

The invention relates to a routing facility for a subsea electronics module (SEM).

BACKGROUND

Subsea electronics modules are preferably used in subsea control units (SCU), e. g. wellhead control units (WCU), for exploring and exploiting gas and oil fields located at the seabed. Gas and oil fields that are explored or exploited using electronic communication to the wellheads or to other subsea control units are sometimes called "electronic fields" (e-fields).

Typically, several subsea control units and several sensors are located in a vicinity of a respective gas or oil field, and are connected to a topside control site. For this purpose, subsea communication is used. For example, process data are transmitted between the topside control site and the subsea control units. In order not to require individual communication and power lines for each subsea control unit, the subsea control units are arranged on the seabed in a network topology. One network member is equipped with a modem for subsea communication with the topside control site. The process data are routed within the network to reach the respective recipient, e.g. either the topside control site or a certain subsea electronic module. Usually, a differential serial bus is used for the network.

In prior art, different techniques for subsea communication have been described. On the one hand, there are wired electric or optical connections, on the other hand there are wireless connections. The wired connections can be subdivided into a first group providing communication lines for electronic or optical connections separate from electric power lines, and a second group utilising power lines for electronic communications. In the latter case, advantageously no separate communication lines are needed.

Known subsea control units require one routing card for each network/bus member that is to be directly connected to them. Hence, if several Slave subsea control units are to be connected to one subsea Master control unit comprising a modem, the same number of routing cards has to be installed into the subsea Master control unit. These multiple routing cards are space-consuming and power-consuming. Besides, in prior art, networks formed by connecting Slave subsea control units via seawater cables require a fixed communication bit rate. Additionally, the reliability of prior art networks is limited, because if a communication line between two Slave subsea control units is broken, there is no more communication possible between them.

SUMMARY

According to various embodiments, a routing facility for a subsea electronics module can be specified by which space and power can be saved within the subsea electronics module, and which allows for performing a method for connecting two Slave subsea electronics modules with improved reliability.

According to an embodiment, a routing facility for a subsea electronics module may comprise a microcontroller, a field programmable gate array and at least two router resources on a single circuit board, each router resource comprising a respective local transceiver for a differential serial bus and a respective remote transceiver for the differential serial bus, wherein each local transceiver is connected with the corresponding remote transceiver and with said field programmable gate array that is able to route data packets between said router resources.

According to a further embodiment, the routing facility may comprise a total of exactly four of said router resources. According to a further embodiment, each of the remote transceivers may be galvanically isolated from the corresponding local transceiver. According to a further embodiment, the remote transceivers may be floating and the local transceivers may be related to a local electrical ground. According to a further embodiment, each of said remote transceivers may comprise active bus termination means and bias means. According to a further embodiment, each of said remote transceivers may be supplied by a respective direct current/direct current converter. According to a further embodiment, each of said direct current/direct current converters may be disengageable separately. According to a further embodiment, said local transceivers can be wired in parallel. According to a further embodiment, said microcontroller and said field programmable gate array may be connectable to a main control unit of the subsea electronics module via a control bus. According to a further embodiment, said control bus may be connectable to the main control unit via a plug-and-socket connection. According to a further embodiment, said single circuit board may comprise at least one input/output interface for at least one of digital and analogue process values. According to a further embodiment, said router resources may provide a variable transmission bit rate. According to a further embodiment, said field programmable gate array may provide a transparent bit rate with a constant delay.

According to another embodiment, a subsea electronics module for a subsea control unit may comprise such a routing facility.

BRIEF DESCRIPTION OF THE DRAWINGS

In the following, the invention is described in further detail with several drawings.

In all drawings, corresponding parts are denoted by identical reference signs.

DETAILED DESCRIPTION

According to various embodiments, a routing facility for a subsea electronics module may comprise a microcontroller, a field programmable gate array and at least two router resources on a single circuit board, each router resource comprising a respective local transceiver for a differential serial bus and a respective remote transceiver for the differential serial bus, wherein each local transceiver is connected with the corresponding remote transceiver and with said field program-mable gate array that is able to route data packets between said router resources. If such a routing facility is used in a subsea electronics module, power consumption as well as required space are significantly reduced in comparison to multiple prior art router cards.

In particular, said transceivers can be half-duplex transceivers for realizing a PROFIBUS DP differential serial bus. Alternatively, the differential serial bus may be a CAN bus.

A prototype of a routing facility embodiment has been built, comprising a preferred total of exactly four of said router resources. By this embodiment, only one router card is needed instead of four conventional cards. Therefore, the subsea electronic module can be constructed very compactly.

A high fault tolerance of subsea networks can be reached with an embodiment where each of said remote transceivers is galvanically isolated from the corresponding local transceiver. Faults and defects due to voltage peaks or short circuits in a seawater cable can be avoided by this embodiment.

The fault tolerance can even be increased by an embodiment where said remote transceivers are floating and said local transceivers are related to a local electrical ground. Errors due to potential differences can be avoided this way.

In another embodiment, each of said remote transceivers comprises active bus termination means and bias means. This increases fault tolerance, too, because the remaining bus/network can be kept working even if one seawater cable is interrupted, for example, if it is accidentally cut.

Preferably, each of said remote transceivers is supplied by a respective direct current/direct current converter. This way, the voltage needed for operation of a connected Slave can be maintained separately for each seawater connection. This increases fault tolerance. In an advanced embodiment, each of said direct current/direct current converters is disengageable separately. This allows for reducing power consumption by switching off converters for router resources that are not linked to any bus members, i. e., they are not in use.

Advantageously, said local transceivers are wired in parallel. In this form, the router resources simply work as a hub for the bus data.

Preferably, said microcontroller and said field programmable gate array are connectable to a main control unit of the subsea electronics module via a control bus. This enables fast data exchange between the main control unit and the routing facility, in particular for communicating data packets to a modem driven by the main control unit.

In another embodiment, said control bus is connectable to the main control unit via a plug-and-socket connection. Therefore, the circuit board can be simply exchanged in case of a defect or a hardware update. In particular, it can be designed as a stackable card such as proposed by the PC104 standard, thus further reducing space consumption.

Space consumption can be reduced even further by an embodiment where said single circuit board comprises at least one input/output (I/O) interface for digital and/or analogue process values. Additional input/output cards can be omitted by using this embodiment, thus further reducing space and power consumption in a subsea electronic module. In the diction of the invention, the term "input/output interface" may comprise both one-directional and bi-directional interfaces, i. e., pure input interfaces, pure output interfaces, and combined input/output interfaces.

Preferably, said router resources provide a variable transmission bit rate. The communication speed on the differential bus can thus be adjusted to a communication speed of a link to the topside control side, for example. Such a link may be, for instance, a power line. In particular, the bit rate on the differential bus can be set to fully exploit the actual maximum communication speed of the topside link. In particular, in embodiments where the microcontroller and the field programmable gate array are connectable to a main control unit of the subsea electronics module via the control bus the bit rate to any connected remote slave device can be adjusted via the routing facility. Each routing channel is transparent with respect to the bit rate of the data passing trough it.

Advantageously, for special embodiments of power line communication to the topside, the said field programmable gate array provides a transparent bit rate with a constant delay. This enables the topside control site to utilise the maximally possible transmission bit rate and to freely adjust the differential bus bit rate of the topside control unit.

Of course, the invention also relates to a subsea electronics module for a subsea control unit, the subsea electronics module comprising a routing facility according to various embodiments.

In an embodiment of such a subsea electronics module a Slave electronics unit is connected to two of said router resources in parallel via two parallel differential bus connections. The corresponding method according to various embodiments proposes to connect a first differential serial bus line to a first remote transceiver of the first subsea electronics module and to a first remote transceiver of the second subsea electronics module, and to connect a second differential serial bus line to a second remote transceiver of the first subsea electronics module and to a second remote transceiver of the second subsea electronics module. This embodiment and this method provide redundancy for the connection between the subsea electronics unit and the Slave electronics unit. For example, if one seawater cable connecting them is cut, e. g. by a falling object, the other one will still provide a connection.

Figure 1:
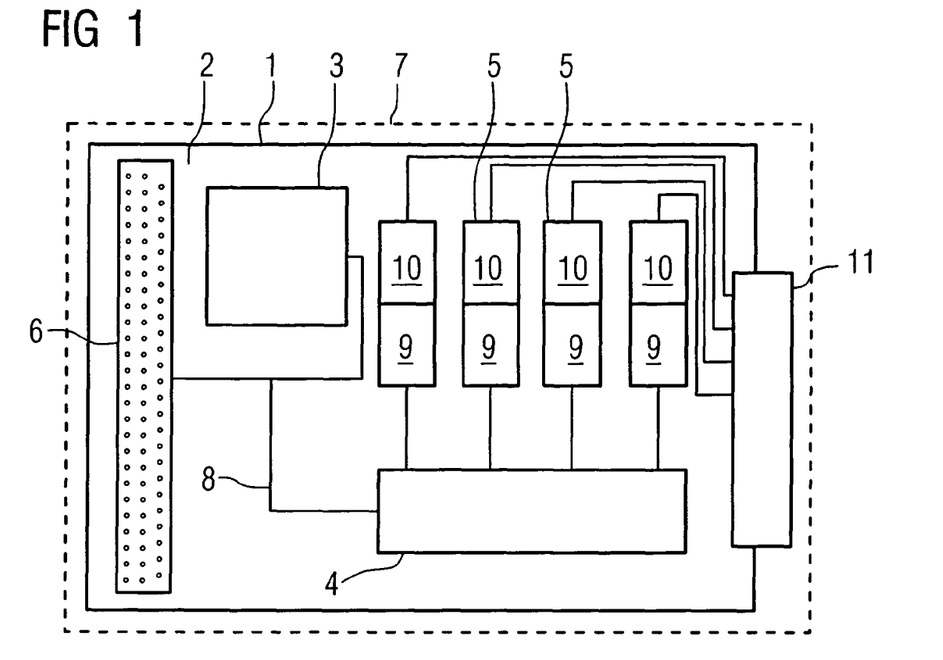
FIG. 1 shows a block diagram of the first side of a routing facility circuit board.

The routing facility 1 shown in a front view in FIG. 1 is a single printed circuit board 2 comprising a microcontroller 3, a field programmable gate array 4 and four router resources 5 alongside a double D-Sub plug-and-socket connector 6. The plug-and-socket connector 6 is arranged through the circuit board 2, having an exemplary 104-pin plug on one side of the circuit board 2 and a corresponding socket on the other side. For example, it is a stackable bus connector according to the PC104 standard. This allows for stacking together the routing facility 1 card with other cards having the same connector type. Such a card stack requires minimal space in a subsea electronic module 7 of a subsea control unit (not shown). The circuit board 2 has a format according to the PC104 standard, for example. Via the plug-and-socket connector 6, it can be connected to the control bus 8 of a subsea electronic module (not shown), in particular to a main control unit (not shown) of such a module. The control bus 8 is an 8-bit industry standard architecture (ISA) bus in the depicted example. Alternatively, it may be a wider ISA bus, a PCI bus or an IEEE 1394 bus, for example. However, the routing facility 1 can also be used separately without a stack. For this purpose, it can alternatively be connected to a subsea electronic module 7 via a bus according to the I²C standard. The routing facility 1, in particular the microcontroller 3, can also be connected to a subsea electronic module via a RS-232 serial interface (not shown) for maintenance access. The routing facility 1 card, i. e., the circuit board 2, may also be used in stand alone operation without a PC104 stack. However, if a PC104 connection is present, power supply for the routing facility 1 is available from it. It is possible to use other power sources as well, in particular in stand alone operation.

Each router resource 5 comprises one half-duplex local transceiver 9 for a differential serial bus and one half-duplex remote transceiver 10 for the differential serial bus. The differential serial bus is a RS-485 PROFIBUS DP in the depicted example. Alternatively, it can be a CAN bus, for example. It is also possible to use full-duplex transceivers 9, 10. The subsea electronic unit 7 can have a Slave of the differential serial bus connected to a topside Master, plus it can provide one or more individual differential serial bus Masters that have separate Slaves attached to their router resources 5.

The remote transceivers 10 are galvanically isolated from the remaining parts of the routing facility 1, in particular from the local transceivers 9. They are provided with active bus termination means (not shown in this figure) and bias means (not shown in this figure). Each remote transceiver 10 is connected to different pins of a single 44-pin plug 11 providing all external connections. In particular, external bus members for the differential serial bus can be connected via the different pins of the plug 11. The plug 11 also can be used for a RS-232 connection to a serial port of an external PC, in particular in stand alone operation of the routing facility 1.

The local transceivers 9 are connected to separate bus ports of the field programmable gate array 4. Each remote transceiver 9 is supplied by a respective direct current/direct current converter (not shown in this figure) that is individually disengageable by the field programmable gate array 4. Usually, a direct current/direct current converter is enabled only if a remote bus member is connected to the corresponding router resource 5 to save power.

Possible bus members that can be connected to the pins of the plug 11 are, for example, other subsea control units, i. e., their electronic modules 7, or sensors (not shown in this figure) able to provide their process data over the differential serial bus. Such sensors are preferably deployed outside the subsea control unit, for example in well trees or on pipelines. The sensors can be seawater sensors, pressure sensors or temperature sensors, for example. These sensors monitor the oil/gas/water production process.

The microcontroller 3 and the field programmable gate array 4 are directly connected to the control bus 8, by which they are accessible, for example, from the main control unit of the subsea electronic module 7 into which the routing facility 1 card is plugged by the plug-and-socket connector 6. The microcontroller 3 serves for setting the PC104 address in a register in the field programmable gate array 4, and for enabling PC104 access to the field programmable gate array 4. It additionally serves for reading and writing all field programmable gate array 4 registers and storing the predefined status conditions. This enables to enter a predefined status upon power-on.

The field programmable gate array 4 has a hardware implementation of all logic for decoding of the PC104 interface. It contains the physical registers for the commands and responses. The router logic is completely implemented in the field programmable gate array 4. There are four instances of this logic in the field programmable gate array 4, each corresponding to one of the router resources 5, and they are controlled by bits in the command registers. Four bits in a Router Control Register in the field programmable gate array 4 enable/disable the router resources 5. If one of the bits is zero, the corresponding router resource 5 will not pass on data from any direction. If the field programmable gate array 4 detects a hardware error in the differential serial bus it automatically shuts down the relevant router resource 5.

A data packet arriving at the field programmable gate array 4 either via the control bus 8, i. e. from the main control unit of the subsea electronic module, or from one of the router resources 5, i. e., from an external source, is routed by the field programmable array 4 to the respective bus destination given in the data packet header. For transmission over the control bus 8, the differential serial bus data packets are wrapped into control bus 8 packets. The field programmable gate array is responsible for wraping/unwrapping respective data packets routed to or from the control bus 8. As the router resources 5 are connected to individual ports of the field programmable gate array 4, the routing facility 1 works as a switch, resulting in minimal bus collisions.

All router resources 5 can work at variable bit rates from 9600 bit/s up to 10 Mbit/s. The field programmable gate array 4 provides a transparent bit rate with a small delay. It listens for traffic in both ends. The side that detects traffic first is connected to the other side. And because each transceiver 9, 10 needs two microseconds to turn off its receiver and to turn on its transmitter, the field programmable gate array 4 delays the data packet bit stream with two microseconds by a shift register (not shown).

The individual router resources 5 can serve different Slave network sections with equal or different communication speeds, i.e., bit rates. In a PROFIBUS DP network the DP Master always defines the communication speed for all DP Slaves that are connected to this DP Master. The main communication channel is with one DP Master located at the topside. This topside DP Master is controlling the DP speed and DP protocol bus parameters which is distributed to all connected subsea DP Slaves upon DP Master start-up sequence.

The maximum differential serial bus bit rate is determined by the various cable characteristics and the length of the various cables in each differential serial bus network. The chosen bit rate is set manually by an expert engineer in a Master bus configuration setup. The consecutive Master restart is activated, and the connected Slaves, including the router channels, will respond according to the DP Master's new communication speed. If it is difficult for an expert engineer to plan the communication speed, the Master can be configured with increased bus bit rate followed by new link resets. In this way it is possible to find the highest possible bit rate for each differential serial bus network. This procedure is used in a planned commissioning activity before a complete system start-up.

In special embodiments providing power line communication via power line modems, a power line modem may give a read-out of the maximally possible bit rate via a diagnosis interface after the modem initialisation is completed. The expert engineer can use this information to set the highest possible differential serial bus bit rate on the Master bus configuration setup. By the routing facility 1 it is possible to substitute four conventional router cards. Thus, power consumption as well as space consumption are reduced to approximately one fourth in comparison to prior art. The communication bit rate is variable, allowing for achieving a maximum bus data transmission speed for each individual subsea installation depending on the environmental situation. Besides, due to bus termination, bias and galvanic isolation, the routing facility 1 is insensitive to external disturbances such as broken seawater cables or external short circuits.

Figure 2:
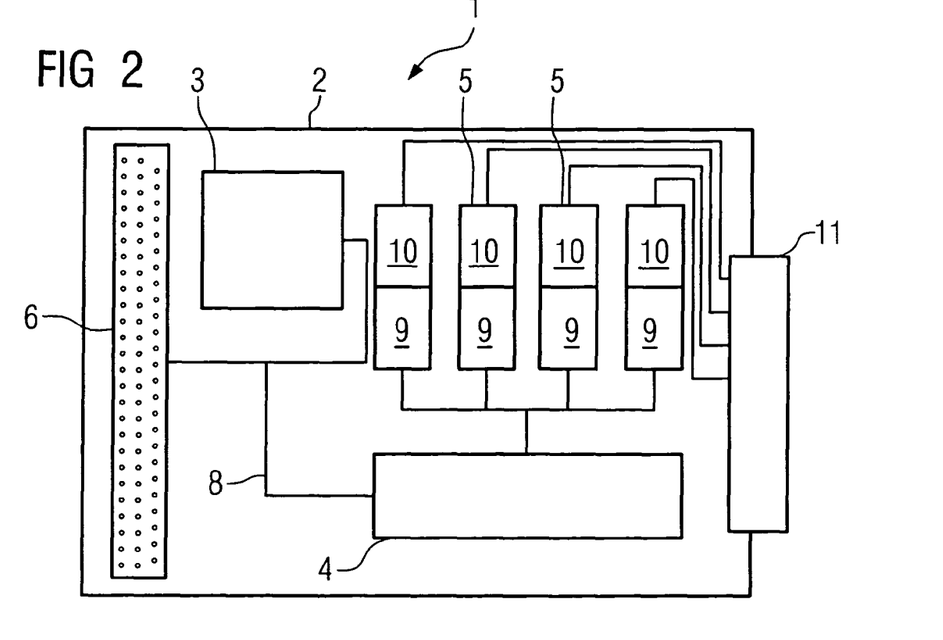
FIG. 2 shows a block diagram of the first side of an alternative routing facility circuit board.

The routing facility 1 shown in FIG. 2 is similar to that of FIG. 1 besides of the way the router resources 5 are connected to the field programmable gate array 4. All local transceivers 9 are connected to the field programmable gate array 4 in parallel. Hence, the routing facility 1 works as a hub as far as the router resources 5 are concerned. This means, that all arriving data packets are distributed to all router resources 5. However, not all data packets arriving from the router resources 5 are routed to the control bus 8. Only data packets having a destination on the control bus 8 or behind it, e. g. at the topside control site, are routed to it.

Figure 3:
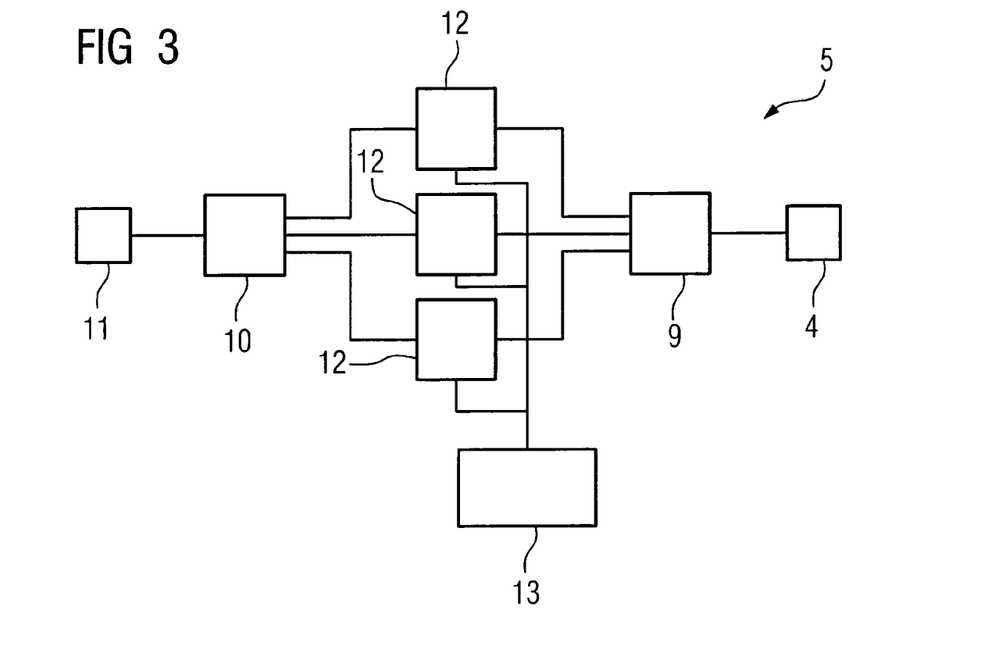
FIG. 3 shows a block diagram of one router resource.

FIG. 3 shows one of the router resources 5 in the form of a block diagram. The local transceiver 9 is located on the right side and is connected to the field programmable gate array 4. The remote transceiver 10 is located on the left side. Three optocouplers 12 provide galvanic isolation for the remote transceiver 10. Floating power for the remote transceiver 10 is supplied by a direct current/direct current converter 13. The local transceiver 9 is related to ground of the subsea electronic module 7. The transceivers 9, 10 are designed for a maximum bit rate of 10 Mbit/s. The optocoupiers 12 are designed for a maximum bit rate of 25 Mbit/s.

Each router resource 5 has an error detector (not shown) that monitors the incoming voltage levels at both the local side and the remote side. If the voltages of the two lines of one side differ about more than a predefined difference for more than 10 bits at the lowest bit rate of 9600 bit/s, the respective router resource 5 is disabled. One of eight status bits in a Router Status Register in the field programmable gate array 4 is set to indicate which router resource 5 and on which side (local/remote) the problem is located. By writing a '1' into a status bit indicating an error, the error is cleared and the corresponding error detector is re-armed.

A respective control bit in the Router Control Register of the field programmable gate array 4 corresponds to each direct current/direct current converter 13. If a bit is zero, the corresponding direct current/direct current converter 13 is disengaged, otherwise it is enabled. Therefore, power can be saved by only enabling direct current/direct current converter 13 actually having attached another bus member.

After the routing facility 1 is powered on or reset, the differential serial bus Master starts its initialisation and transfers the bus speed and bus parameters to all bus Slaves on this network via the relevant router channels. The microcontroller 3 can detect the maximum communication bit rate on the differential serial bus.

The power-on configuration of the routing facility 1 is independently controlled for each router channel, i. e., router resource 5. The default start-up condition is with the direct current/direct current power converters 13 switched on and with the router resources 5 enabled. This is important to enable the differential serial bus Master to reach the differential serial bus Slaves upon system power on. The router resources 5 will simply adapt to the communication speed defined by the differential serial bus Master and the router resources 5 will ensure to adapt to this speed. Each differential serial bus Slave will receive the differential serial bus bit rate defined by the differential serial bus Master as the first part of the link start-up sequence. The differential serial bus Master is preconfigured with the differential serial bus Slave addresses of all differential serial bus Slaves on this differential serial bus.

Figure 4:
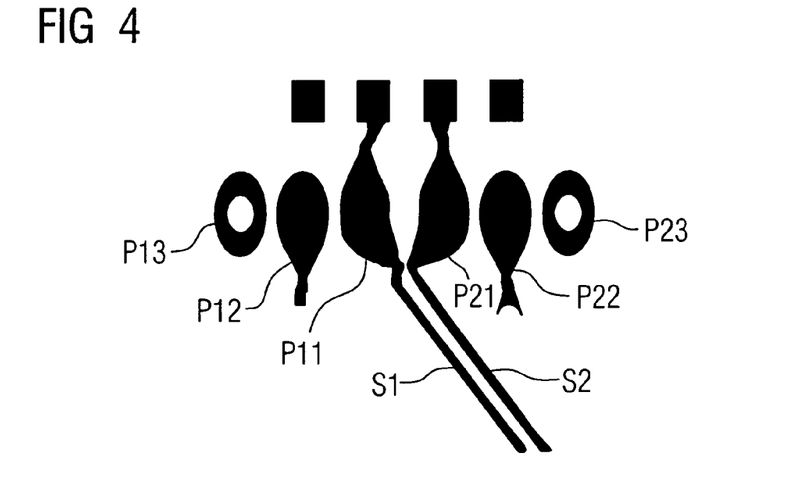
FIG. 4 shows the flexible arrangement of different terminations by wiring contact pads at each router resource.

FIG. 4 shows contact pads Pxi (x=1, 2; i=1, 2, 3) on both lines S1, S2 of the differential bus in front of a remote transceiver 10. All local and remote transceivers 9, 10 have similar pads in front of them, following the same pattern. They allow for configuring the electrical behaviour of the respective transceiver 9, 10 by appropriately wiring the contact pads. Instead of wiring, jumpering can be used if the contact pads are appropriately provided with pins. Without any wiring between the pads there will be no termination and no bias at all. Wiring pad P11 with P12, as well as P21 with P22, results in a 220 Ohm active termination. Wiring together pads P11, P12 and P13, as well as P21, P22 and P23, results in 220 Ohm active termination and bias. However, as a rule, subsea PROFIBUS DP cables should always be terminated at both ends. Although this will result in power consumption higher than necessary for short cables, the inputs of the transceivers 9, 10 are protected against breakdown due to overvoltage.

Figure 5:
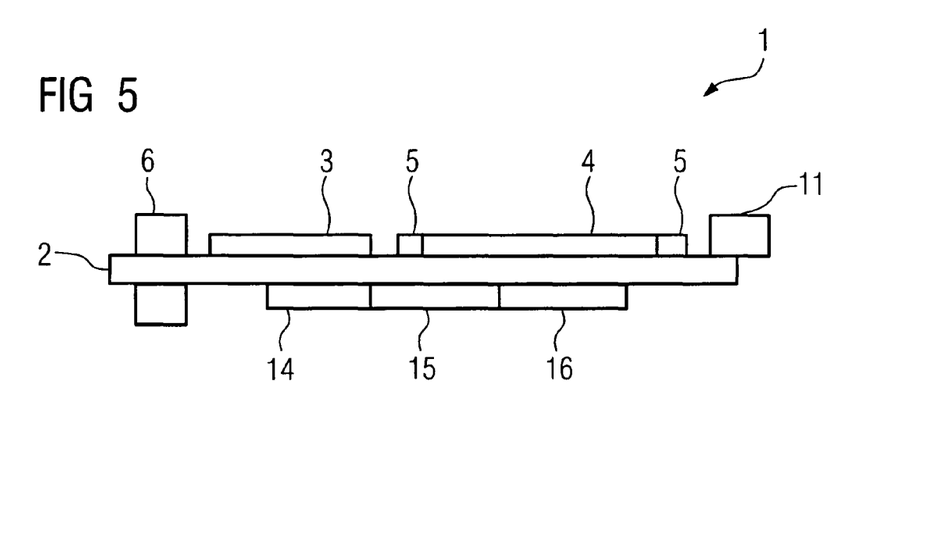
FIG. 5 shows a schematic side view of the routing facility circuit board of FIG. 1.

FIG. 5 shows a schematic side view of the circuit board 2 comprising the routing facility 1 on its upper side. On the second side, three dedicated input/output interfaces 14, 15, 16 are arranged, namely a digital input interface 14, a digital output interface 15 and an analogue input interface 16. Each interface 14, 15, 16 has multiple ports for acquiring and outputting process data, respectively.

Figure 6:
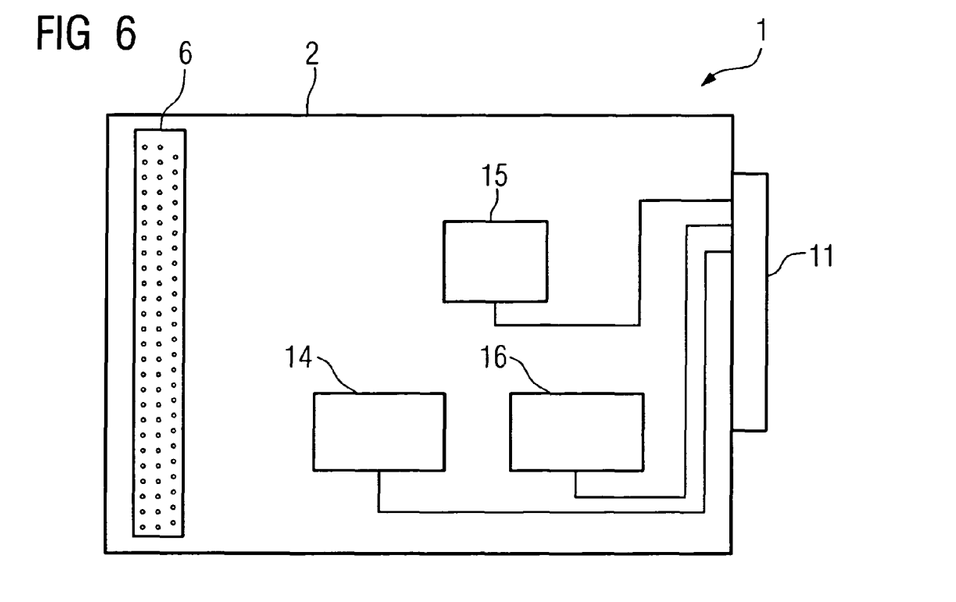
FIG. 6 shows a block diagram of the back side of the routing facility circuit card of FIG. 1.

The input/output interfaces 14, 15, 16 can be seen better in FIG. 6 showing a schematic view onto the back side of the circuit board 2. Arranging the routing facility 1 and input/output interfaces 14, 15, 16 on both sides of a single circuit board 2 results in further reduction of power consumption and space consumption, as in prior art three separate cards were necessary for this purpose. By the routing facility 1 according to this example, the required number of cards can be reduced from four (two standard input/output interface cards, one router card, one custom-made input/output card) to one.

The input/output interfaces provide universal connectability for digital and/or analogue process data sources. Digtal/analogue signal sources can be connected at ports 11. The main control unit (not shown in this figure) of the subsea electronic module (not shown in this figure) accesses the input/output interfaces 14, 15, 16 via the control bus 8 and the microcontroller 3 to which the interfaces 14, 15, 16 are connected. In contrast to the router resources 5, they are not directly connected to the control bus 8.

The digital input interface 14 can be used, for example, for acquiring the status of relays, in particular switches and power relays, or the status of power sensing circuits. The digital output interface 15 can be used, for example, for setting/clearing the status of such a relay, in particular power-resetting a remote sensor interface. The analogue input interface 16 can be used, for example, for values resulting from insulation monitoring of seawater electric cables or pressure measurement or temperature measurement inside a subsea control unit or a pipeline. For instance, the insulation monitoring of power and differential serial bus seawater cables may result in analogue voltages corresponding to resistance values between 100 kOhm and 18 MOhm. If insulation is damaged, the resistance value will significantly drop. This can be detected by the microcontroller 3 in the digitized voltage values, whereby the respective router resource (not shown in this figure) can be disabled. The analogue input interface 16 comprises an exemplary 16-bit analogue-to-digital converter. All input values are buffered for the microcontroller 3 to read them out and process them further. For example, the microcontroller 3 can either reply the digital/digitized values to time-based queries of the topside control site, or it may itself monitor the values and only report deviations from predefined tolerable value intervals.

The digital/digitized values can be stored in registers of the field programmable gate array (not shown in this figure) in the form of different ring loops by the microcontroller 3. From there, the values can be read out by other bus members, in particular by the topside control site (not shown in this figure).

Figure 7:
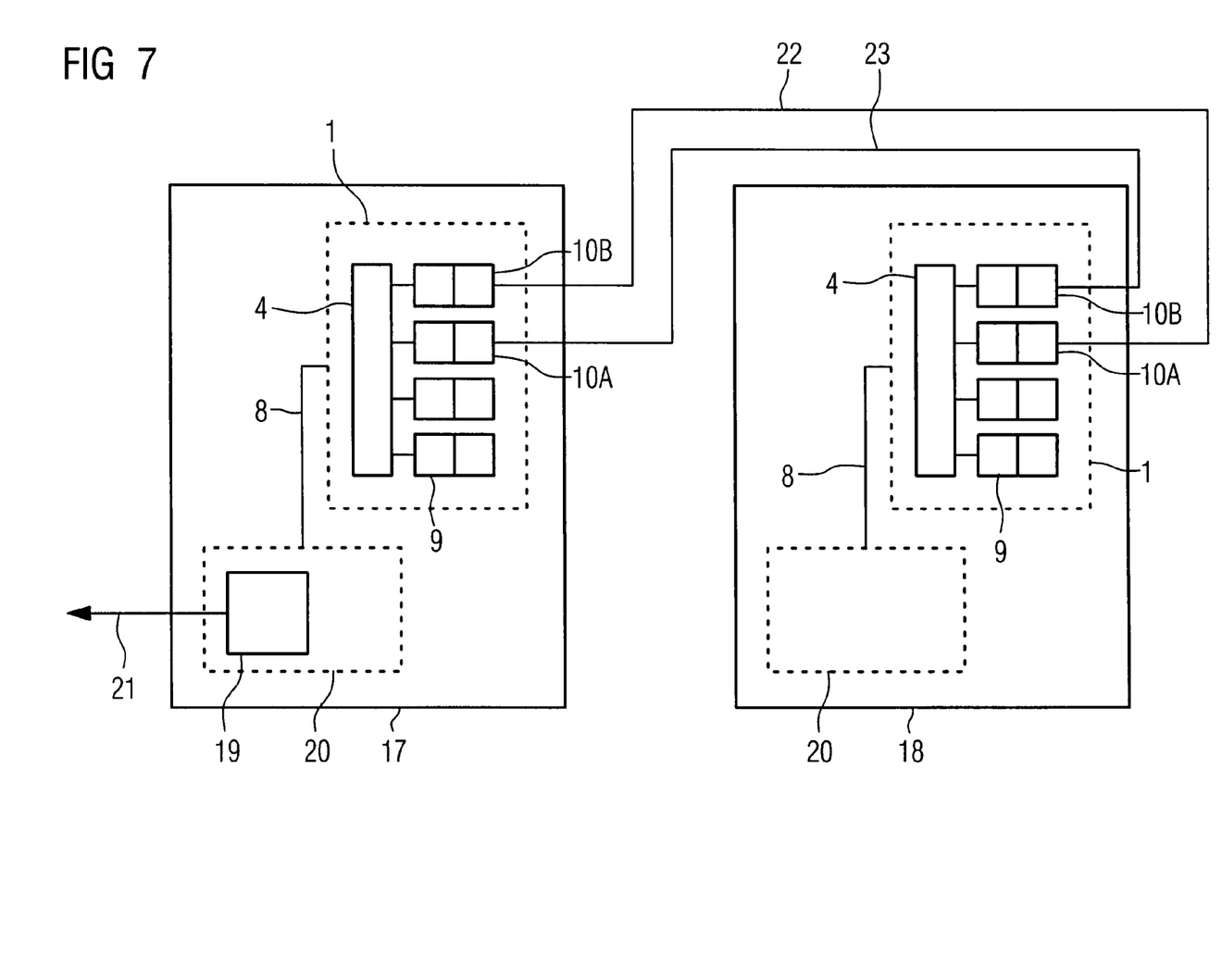
FIG. 7 shows a block diagram of two redundantly connected subsea control units.

In FIG. 7, a redundant way for connecting two subsea electronic modules 17, 18 is shown. Both subsea electronic modules 17, 18 comprise a respective routing facility 1 according to various embodiments. They include four router resources 5 each. The first subsea electronic unit 17 comprises a subsea power line modem 19 within its main control unit 20. The power line modem 19 is connected to a power line 21 leading to the topside control site (not shown in this figure).

Redundancy is achieved by connecting the subsea control units 17, 18 by two differential serial bus lines 22, 23. The first differential serial bus line 22 is connected to the remote transceivers 10A of the subsea electronics modules 17, 18. The second differential serial bus line 23 is connected to the second remote transceivers 10B of the subsea electronics modules 17, 18. Any data packets arising or arriving at one of the subsea electronics modules 17, 18 are then routed in parallel via both differential serial bus lines 22, 23.

Figure 8:
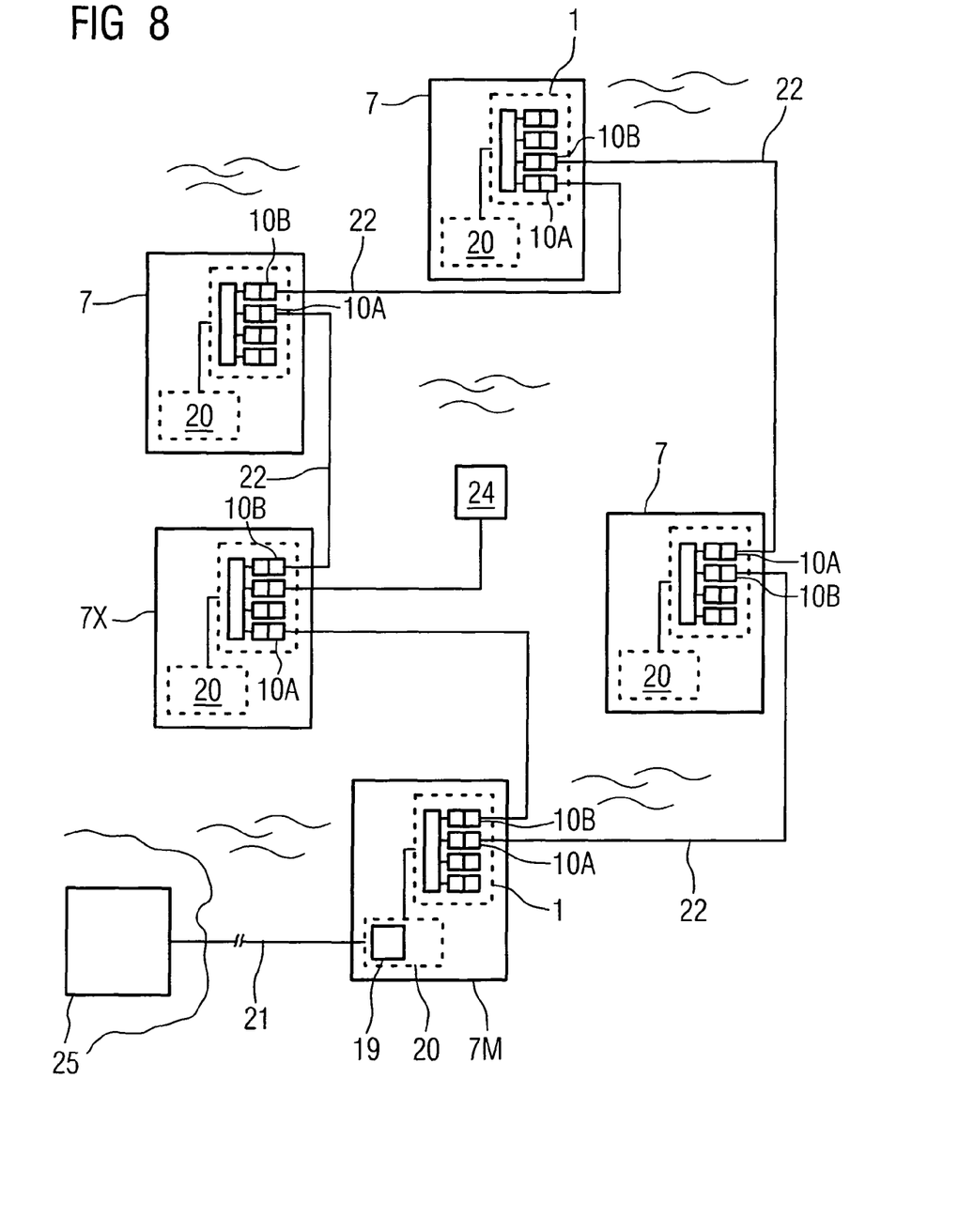
FIG. 8 schematically shows a redundant network topology of subsea control units.

FIG. 8 shows a different way of achieving redundancy in a subsea network. Several subsea control units (not shown), each comprising a subsea electronic module 7 having a routing facility 1, form a subsea closed ring topology. One subsea electronic module 7M comprises a subsea power line modem 19. The subsea electronic modules 7 are connected in series via multiple differential serial bus lines 22 running from a respective first remote transceiver 10A to a respective second remote transceiver 10B. If the ring topology is interrupted in one place, may it be a damaged subsea electronic module 7 or a broken or short-cut differential serial bus line 22 seawater cable, the routed data packets still reach all functional subsea electronic modules 7.

A seawater sensor 24 for measuring the temperature of a pipeline (not shown) is connected to a remote transceiver 10 of the subsea electronic module 7X. As it is a member of the PROFIBUS DP this way, the topside control site 25 receives the process values measured by the seawater sensor 24. All data packets are transmitted via the power line 21 to the subsea electronic module 7M and, subsequently, automatically routed around the PROFIBUS DP ring topology to the subsea electronic module 7X by the routing facilities 1. The router resources 5 can also include separate CAN bus interfaces to subsea sensors such as the seawater sensor 24, for example.

The invention claimed is:

1. A routing facility for a subsea electronics module, the routing facility comprising:
   a microcontroller, a field programmable gate array and at least two router resources on a single circuit board,
   wherein each router resource comprises:
      a respective local transceiver for a differential serial bus and a respective corresponding remote transceiver for the differential serial bus,
      wherein the local transceiver is connected with the corresponding remote transceiver and with said field programmable gate array to handle communication between the remote transceiver and the field programmable gate array and wherein the remote transceiver handles communication with a device external to the single circuit board, wherein the field programmable gate array is configured to route data packets between said router resources,
   wherein the local transceivers and respective remote transceivers of the at least two router resources are physically provided on the single circuit board.

2. The routing facility according to claim 1, comprising a total of exactly four of said router resources.

3. The routing facility according to claim 1, wherein each of said remote transceivers is galvanically isolated from its corresponding local transceiver by one or more optocouplers provided on the circuit board.

4. The routing facility according to claim 1, wherein said remote transceivers comprise a floating power supply and a power supply of said local transceivers comprises a local electrical ground.

5. The routing facility according to claim 1, wherein each of said remote transceivers comprises active bus termination means and bias means.

6. The routing facility according to claim 1, wherein each of said remote transceivers is supplied by a respective direct current/direct current converter.

7. The routing facility according to claim 6, wherein each of said direct current/direct current converters is disengageable separately.

8. The routing facility according to claim 1, wherein said local transceivers are wired in parallel.

9. The routing facility according to claim 1, wherein said microcontroller and said field programmable gate array are connectable to a main control unit of the subsea electronics modules via a control bus.

10. The routing facility according to claim 9, wherein said control bus is connectable to the main control unit via a plug-and-socket connection.

11. The routing facility according to claim 1, wherein said single circuit board comprises at least one input/output interface for at least one of digital and analogue process values.

12. The routing facility according to claim 1, wherein said router resources provide a variable transmission bit rate.

13. The routing facility according to claim 12, wherein said field programmable gate array provides a transparent bit rate with a constant delay.

14. A routing method, comprising:
   providing a subsea electronics module comprising a microcontroller, a field programmable gate array and at least two router resources on a single circuit board, wherein each router resource comprises a respective local transceiver for a differential serial bus and a respective corresponding remote transceiver for the differential serial bus, wherein the local transceivers and respective remote transceivers of the at least two router resources are physically provided on the single circuit board,
   handling communication between the remote transceiver and the field programmable gate array by connecting each local transceiver with its corresponding remote transceiver and with said field programmable gate array, wherein each remote transceiver handles communication with a device external to the single circuit board, and
   routing data packets between said router resources by means of said field programmable gate array.

15. The method according to claim 14, comprising the step of galvanically isolating each of said remote transceivers from its corresponding local transceiver by one or more optocouplers provided on the circuit board.

16. The method according to claim 14, comprising the step of supplying each of said remote transceivers by a respective direct current/direct current converter.

17. The method according to claim 14, comprising the step of connecting said microcontroller and said field programmable gate array to a main control unit of the subsea electronics module via a control bus.

18. The method according to claim 14, comprising the step of providing a variable transmission bit rate by said router resources.

19. The method according to claim 18, wherein providing a transparent bit rate with a constant delay by said field programmable gate array.

* * * * *